(12) United States Patent
Nikolai et al.

(10) Patent No.: US 11,588,873 B2
(45) Date of Patent: Feb. 21, 2023

(54) SELECTIVE ENCRYPTION OF STREAMING DATA

(71) Applicant: International Business Machines Corporation, Armonk, NY (US)

(72) Inventors: Jason A. Nikolai, Rochester, MN (US); Michael J. Branson, Rochester, MN (US); Ryan K. Cradick, Oronoco, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 24 days.

(21) Appl. No.: 17/147,627

(22) Filed: Jan. 13, 2021

(65) Prior Publication Data

US 2022/0224743 A1  Jul. 14, 2022

(51) Int. Cl.
*H04L 65/70* (2022.01)
*H04L 65/61* (2022.01)
*H04L 65/65* (2022.01)

(52) U.S. Cl.
CPC .............. *H04L 65/70* (2022.05); *H04L 65/61* (2022.05); *H04L 65/65* (2022.05)

(58) Field of Classification Search
CPC . H04L 65/607; H04L 65/4069; H04L 65/608; H04L 67/10; H04L 67/2823; H04N 21/2662

USPC .......................................................... 709/231
See application file for complete search history.

(56) References Cited

U.S. PATENT DOCUMENTS

| | | | | |
|---|---|---|---|---|
| 7,167,560 B2* | 1/2007 | Yu | ...................... | H04N 21/2662 |
| | | | | 348/E7.056 |
| 8,799,671 B2* | 8/2014 | Conte | ..................... | G06F 21/78 |
| | | | | 713/193 |
| 10,129,370 B2* | 11/2018 | Levy | ................... | H04L 67/2823 |
| 10,887,291 B2* | 1/2021 | Davis | ..................... | H04L 67/10 |
| 2019/0124007 A1* | 4/2019 | Cook | .................. | H04L 63/0428 |

* cited by examiner

*Primary Examiner* — Glenford J Madamba
(74) *Attorney, Agent, or Firm* — Garg Law Firm, PLLC; Rakesh Garg; Rakesh Roy

(57) ABSTRACT

An embodiment includes determining, in response to receiving data at a source node for transmission as streaming data on a network, whether a characteristic of the data indicates that an attribute of the data includes sensitive information. The embodiment also includes calculating, responsive to determining that the attribute includes sensitive information, an entropy value for the attribute. The embodiment also includes determining, responsive to the calculating of the entropy value, a likelihood that the attribute is encrypted by comparing the entropy value to a threshold value. The embodiment also includes generating a parameter value for a cryptographic parameter for the attribute.

16 Claims, 9 Drawing Sheets

SELECTIVE ENCRYPTION OF STREAMING DATA

BACKGROUND

The present invention relates generally to a method, system, and computer program product for stream computing. More particularly, the present invention relates to a method, system, and computer program product for selective encryption of streaming data.

Database systems are typically configured to separate the process of storing data from accessing, manipulating, or using data stored in a database. In traditional, static database systems, data is first stored and indexed in memory before subsequent querying and analysis. In general, such static database systems are not always well-suited for performing real-time processing and analyzing streaming data. For example, static database systems are sometimes unable to store, index, and analyze large amounts of streaming data efficiently or in real time.

Streams-based computing and streams-based database computing have emerged in recent years as developing technologies for database systems. In a streams application, nodes connected to one another across a network allow data to flow from one node to the next. Such data flows encapsulate blocks of data in a "tuple." A tuple is a block of data of one or a variety of different data types, such as integer, float, Boolean, or string data. Groups of tuples are transmitted in sequences referred to as a "stream" or "data stream." In particular, it may occur that data arrives essentially continuously, as a stream of data points corresponding to an ongoing or continuous event.

For example, data representing the price of a particular stock may generally fluctuate over the course of a day, and a data stream management system may continuously receive updated stock prices, e.g., at equal time intervals or as the price changes. Other examples of such data streams include temperature or other environmental data collected by sensors, computer network analytics, patient health data collected at a hospital, or data describing a manufacturing process or other business process(es).

SUMMARY

The illustrative embodiments provide for selective encryption of streaming data. An embodiment includes determining, in response to receiving data at a source node for transmission as streaming data on a network, whether a characteristic of the data indicates that an attribute of the data includes sensitive information. The embodiment also includes calculating, in response to determining that the attribute includes sensitive information, an entropy value for the attribute. The embodiment also includes determining, responsive to the calculating of the entropy value, a likelihood that the attribute is encrypted by comparing the entropy value to a threshold value. The embodiment also includes generating a parameter value for a cryptographic parameter for the attribute. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
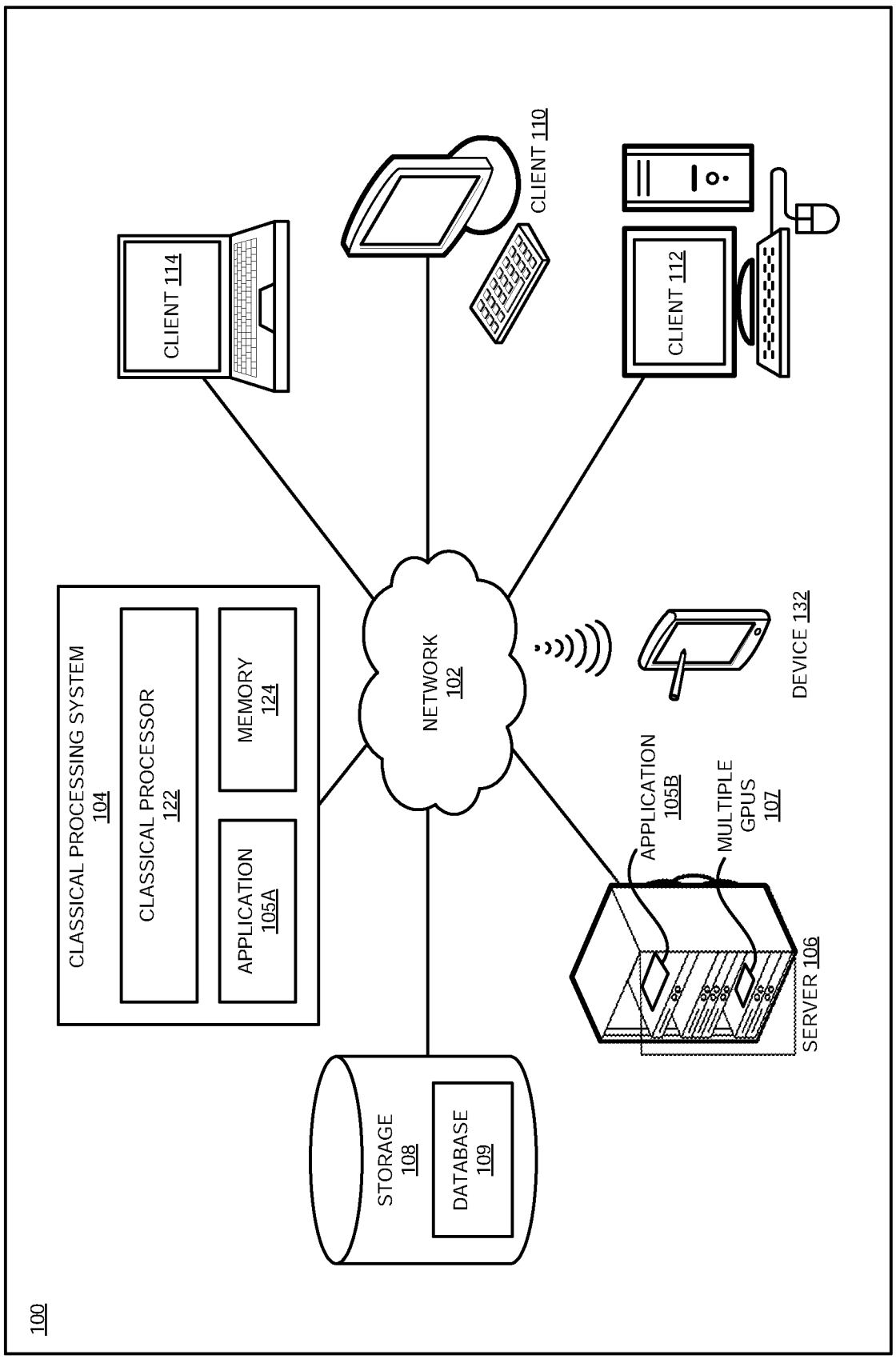
FIG. 1 depicts a block diagram of a network of data processing systems in which illustrative embodiments may be implemented.

Streams processing involves the processing of data streams in real time or near-real time. Data is ingested from one or more sources and processed by one or more functions, called operators. In recent years, this technology has moved from running within organizational data centers to running in multi-tenant cloud environments.

Many times, streams applications, or applications developed for a specific purpose, ingest and process sensitive data. The term "sensitive data," as used herein, refers to data representative of information that an individual or business entity considers secret or confidential or that an individual or business entity would reasonably consider private, and includes information that is subject to statutory, regulatory, or other types of compliance requirements for encryption while being electronically transmitted over a network. For example, sensitive data includes data representative of Personally Identifiable Information (PII), Protected Health Information (PHI), or Payment Card Information Data Security Standard (PCI DSS) information.

In order to meet compliance and regulatory requirements, this data is encrypted in flight. Many times, to ensure compliance requirements are achieved, data ends up being double encrypted. For example, a streams application that receives and streams sensitive data may be configured to automatically encrypt or establish a secure communications channel for the sensitive data that may or may not already be encrypted. If the sensitive data is encrypted when received by the streams application, the streams application will automatically encrypt it again, resulting in double encryption. This is a significant problem in streams processing due to the impact on performance caused by encryption-related processing.

The advantage of products, such as IBM Streams, is the massive scalability and performance (IBM is a registered trademark of International Business Machines corporation in the United States and in other countries). Performance advantages include improvements in terms of being able to ingest, filter, analyze, and correlate potentially massively larger volumes of continuous data streams in a given time frame than was previously possible. While encryption technologies have gotten faster and better via hardware and chip support, a performance impact is still recognized in high performance streams processing.

These data double-encryption and impacted performance issues can be resolved by implementations of the present disclosure. The systems and methods of the present disclosure address problems particular to streams processing of potentially sensitive data by introducing systems and methods that identify sensitive data and encrypted data in order to intelligently determine whether the data needs to be encrypted. For example, if the sensitive attributes within a tuple are already encrypted, the tuple can be streamed without having an encrypted channel (e.g., TLS). As a result, unnecessary encryption-related processes can be skipped when not necessary. The implementations of the present disclosure thus introduce significant performance improvements for stream processing applications that stream sensitive data.

In an illustrated embodiment, an encryption manager receives data from a source node that was received by the source node for transmission as streaming data on a streams. In some embodiments, the encryption manager determines whether the data includes sensitive information. In some embodiments, the encryption manager calculates an entropy value for the data to determine a likelihood that the attribute is already encrypted. In some embodiments, the encryption manager limits encryption processes to only that data that is determined to be sensitive data and is not already encrypted.

In some embodiments, an encryption manager determines whether a characteristic of data indicates that an attribute of the data includes sensitive information. In some embodiments, a characteristic of the data includes a flag, tag, schema, tuple definition, or metadata indicative of whether the data includes sensitive information. In some embodiments, a characteristic of the data includes a degree to which the data matches a pattern previously determined to be a pattern of sensitive data.

In some embodiments, an encryption manager determines whether sensitive data is already encrypted. In some embodiments, the encryption manager receives data from a source node that was received by the source node for transmission as streaming data on a streams. In some embodiments, the encryption manager determines whether the data is already encrypted by calculating an entropy value for the data. In some embodiments, the encryption manager determines a likelihood that the data is encrypted by comparing the entropy value to a predetermined threshold value. In some embodiments, the encryption manager limits encryption processes to only data that the encryption manager determined to be sensitive data and unlikely to already be encrypted.

In an illustrated embodiment, an encryption manager receives data from a source node that receives data from a data source for transmission as streaming data in a streaming application. In some embodiments, the encryption manager determines whether the data includes sensitive information and whether that sensitive information is already encrypted while the data is being processed at the source node. In some embodiments, the encryption manager outputs a parameter value to the source node, where the parameter value is indicative of whether the data should be encrypted. In some embodiments, the parameter value is instructive to the source node to cause the source node to encrypt the data or skip encryption of the data.

In an illustrated embodiment, an encryption manager receives data from a source node that was received by the source node for transmission as streaming data on a streams. In some embodiments, the encryption manager determines whether the data includes sensitive information. In some embodiments, the encryption manager determines that the data is not sensitive data, and speeds up processing by then omitting calculating an entropy value for the non-sensitive attribute. The embodiment also includes transmitting the attribute from the source to a sink node along respective network paths.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
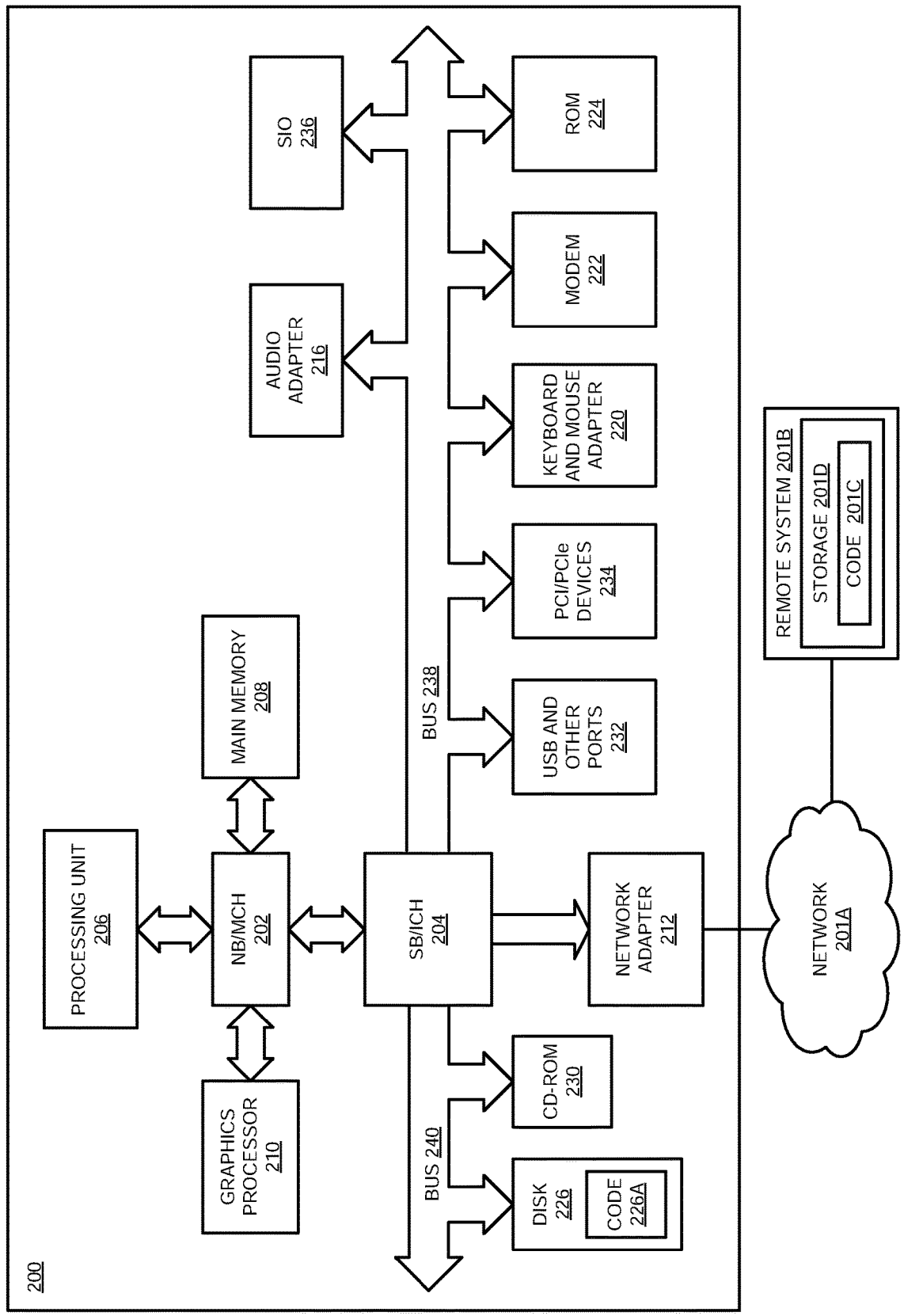
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes processing elements of a stream processing application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by stream processing application 105B such as initiating processes described herein. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
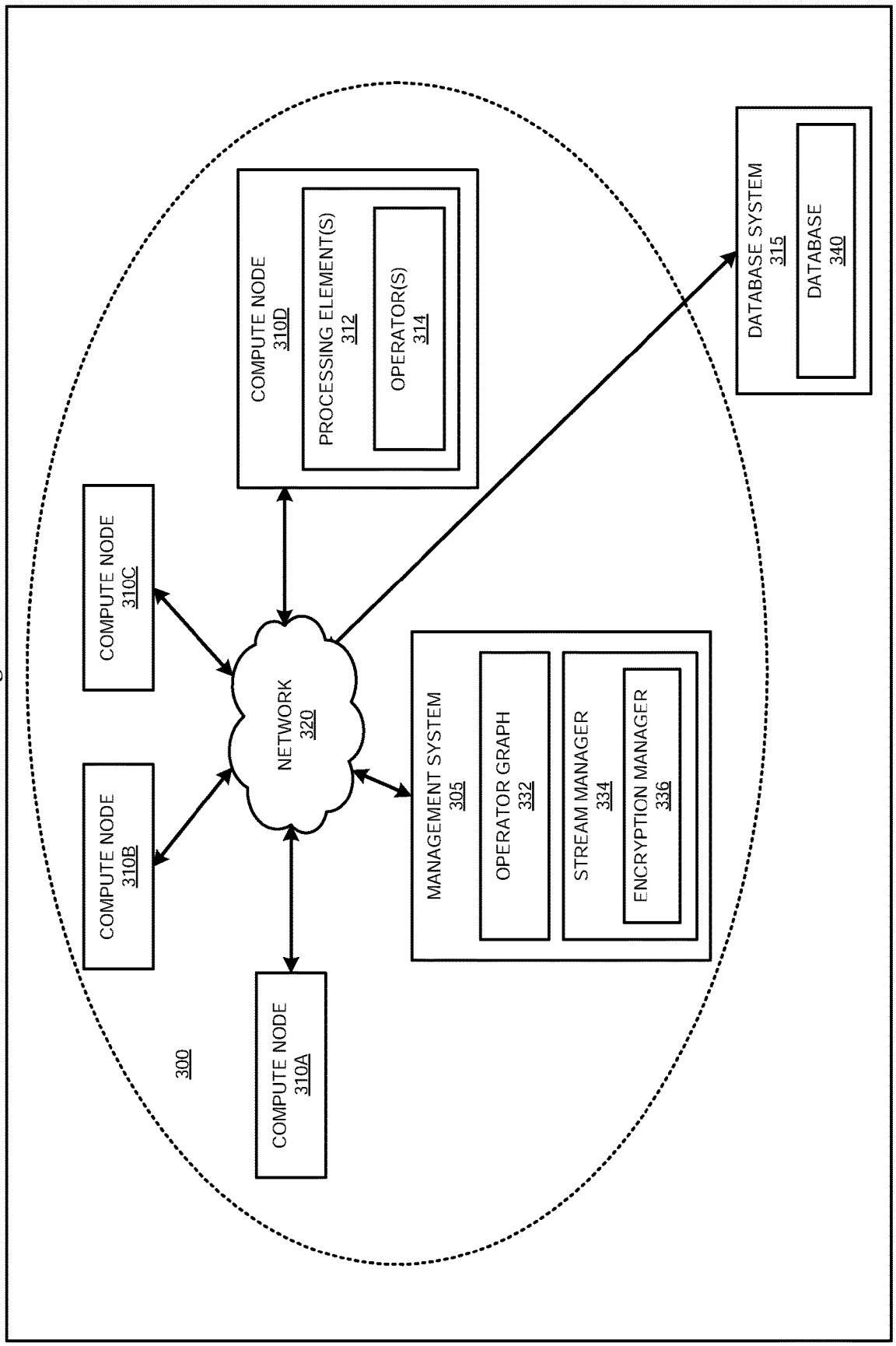
FIG. 3 depicts block diagram of an example streams application environment in accordance with an illustrative embodiment.

With reference to FIG. 3, this figure depicts a block diagram of an example streams application environment 300 in accordance with an illustrative embodiment. In an embodiment, the streams application environment 300 is configured to execute a streams application, which is an example of application 105A/105B of FIG. 1.

In the illustrated embodiment, the streams application environment 300 includes a management system 305 and a plurality of compute nodes 310A-310D (herein generically referred to as nodes 310)—i.e., hosts—which are communicatively coupled to each other using one or more communications networks 320. In an embodiment, the communications network 320 includes one or more servers, networks, or databases, and uses a communication protocol to transfer data among compute nodes 310. In an embodiment, a database system 315 containing a database 340 is communicatively coupled to network 320 for communication with compute nodes 310. In a particular embodiment, database system 315 is an example of server 106 with database 109 of FIG. 1, and nodes 310A-310D are examples of data processing system 104, clients 110, 112, and 114, and device 132 of FIG. 1.

In the illustrated embodiment, the one or more compute nodes 310A-310D is configured as shown for compute node 310D, such that each of the compute nodes 310A-310D comprise one or more processing elements 312, and each processing element includes one or more operators 314. Operators 314 are the fundamental building blocks of the streams application. In some embodiments, the compute nodes 310A-310D each run a Linux operating system, and each processing element 312 represents a Linux process, and within each Linux process there are operators 314 that run one or more aspects of the streams application.

In some embodiments, the management system 305 includes an operator graph 332 and a stream manager 334, which in turn includes an encryption manager 336. In some embodiments, the operator graph 332 includes a description of the stream network topology, such as the location, arrangement, connections, and functionality of various operators on nodes 310 of the streams application environment 300. In some embodiments, the stream manager 334 monitors a stream computing application running on compute nodes 310. In some embodiments, the stream manager 334 changes the deployment of the operator graph 332. In some embodiments, the stream manager 334 move processing elements from one compute node 310 to another, for example, to manage the processing loads of the compute nodes 310A-310D in the streams application environment 300. Further, in some embodiments, the stream manager 334 controls the stream computing application by inserting, removing, fusing, un-fusing, or otherwise modifying processing elements and stream operators of computer nodes 310.

Figure 4:
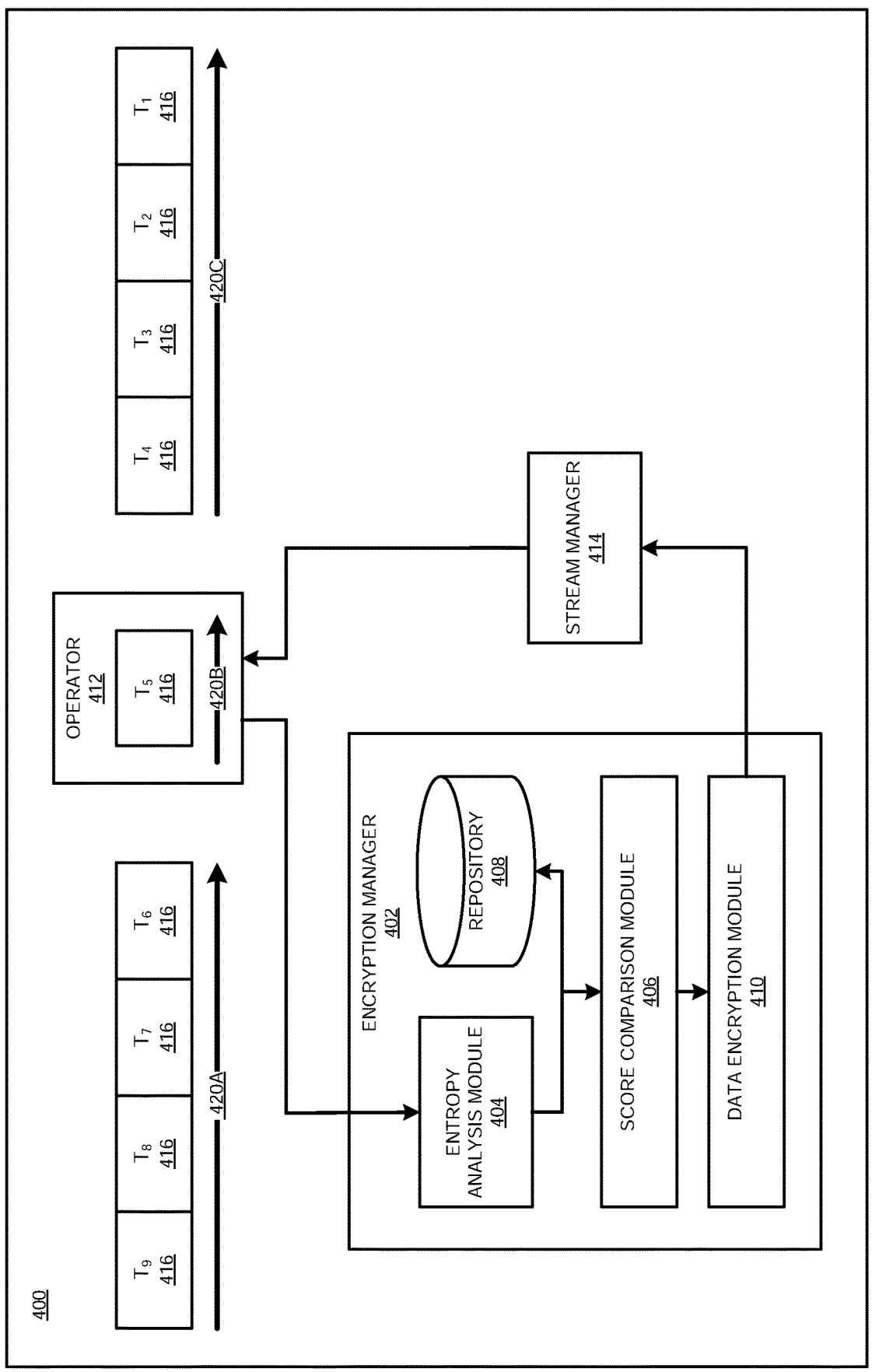
FIG. 4 depicts a block diagram of an example encryption management computing environment in accordance with an illustrative embodiment.

With reference to FIG. 4, this figure depicts a block diagram of an example encryption management computing environment 400 in accordance with an illustrative embodiment. In an embodiment, the computing environment 400 includes an encryption manager 402 configured to selectively implement network security protocols on streaming data, which is an example of encryption manager 336 of FIG. 3.

In the illustrated embodiment, the encryption manager 402 includes an entropy analysis module 404, a score comparison module 406, a repository 408, and a data encryption module 410. The encryption manager 402 receives data being streamed by the streams application as the data is being processed by an operator 412 and outputs an indication as to whether any of the steaming data should be encrypted, transmitted on a secure channel, or transmitted without any additional security enhancement. For example, in some embodiments, the encryption manager 402 supports establishing connections that use either Secure Sockets Layer (SSL) or Transport Layer Security (TLS) cryptographic protocols. In some embodiments, the functionality described herein is distributed among a plurality of systems, which can include combinations of software and/or hardware based systems, for example Application-Specific Integrated Circuits (ASICs), computer programs, or smart phone applications.

As shown in FIG. 4, the operator 412 receives data tuples 416 on stream 420. For clarity purposes, the processed data includes tuples T1-T4 on stream portion 420C, the currently-processed tuple T5 on stream portion 420B, and the data streaming towards the as the operator 412 as tuples T6-T9 on stream portion 420A, although an actual implementation will have a stream of continuous data.

In some embodiments, the operator 412 is a source adapter (also referred to as a source operator or just a source) that is located at the beginning of the streams application. A source adapter is an operator that reads data from external systems and produces a stream as its output. Other types of operators process the stream as it is received from an upstream operator and produces a new output stream that is sent to a downstream operator. In some embodiments, the operator 412 processes data on a tuple-by-tuple basis as shown in FIG. 4. Alternatively, in some embodiments, the operator 412 operates on a window of data at a time. When processing is complete, the operator 412 submits the results as a new tuple to the next downstream operator unless the operator is a sink adapter, in which case the data stream ends. An operator can be programmed to perform any kind of processing on the data. For example, an operator can be programmed to perform simple processing like filtering unwanted data or transforming data from one format to another. An operator can also be programmed for more advanced analytics like predictive forecasting, data mining, text analytic, and geofencing.

In the illustrated embodiment, the encryption manager 402 includes an entropy analysis module 404 and a score comparison module 406 as software, hardware or firmware components. The entropy analysis module 404 receives tuple data from the operator 412 as the tuple data is being streamed by the streams application and processed by the operator 412. The entropy analysis module 404 uses an entropy analysis of the tuple data to determine whether the data is encrypted. In some embodiments, the estimated measure of entropy is calculated as a measure of a degree of indeterminacy of information stored as data in the tuples, such as an estimated measure of Shannon entropy.

In some embodiments, the score comparison module 406 receives an estimated measure of entropy from the entropy analysis module 404 for comparison with a reference measure of entropy in the repository 408. The repository 408 is any suitable data storage mechanism for the storage of reference measures of entropy, such as a data structure, memory area, file, database or the like. While the repository 408 is illustrated as being internal to the encryption manager 402, the repository 408 can alternatively be located elsewhere. In some embodiments, the reference measure of entropy is a measure of entropy for an encrypted sample of data. The reference measure of entropy is predetermined by a suitable mechanism such as through observation of encrypted data.

Accordingly, in use, the score comparison module 406 is operable to compare an estimated measure of entropy from the entropy analysis module 404 with the reference measure of entropy for encrypted data. In response to a determination, by the score comparison module 406, that the estimated measure of entropy for tuple data from the operator 412 is sufficiently similar to the reference measure of entropy, the score comparison module 406 outputs a positive identification of encrypted data. The sufficiency of the similarity in the entropy measures can be achieved on the basis of a comparison algorithm including a comparison allowing for a degree of deviation based on a predetermined level of acceptable deviation. For example, in some embodiments, the reference measure of entropy is defined as a midpoint in a linear range of entropy measures deviating by a predetermined extent above and below the midpoint. Alternatively, in some embodiments, the reference measure of entropy is a range of reference entropy measures.

Figure 5:
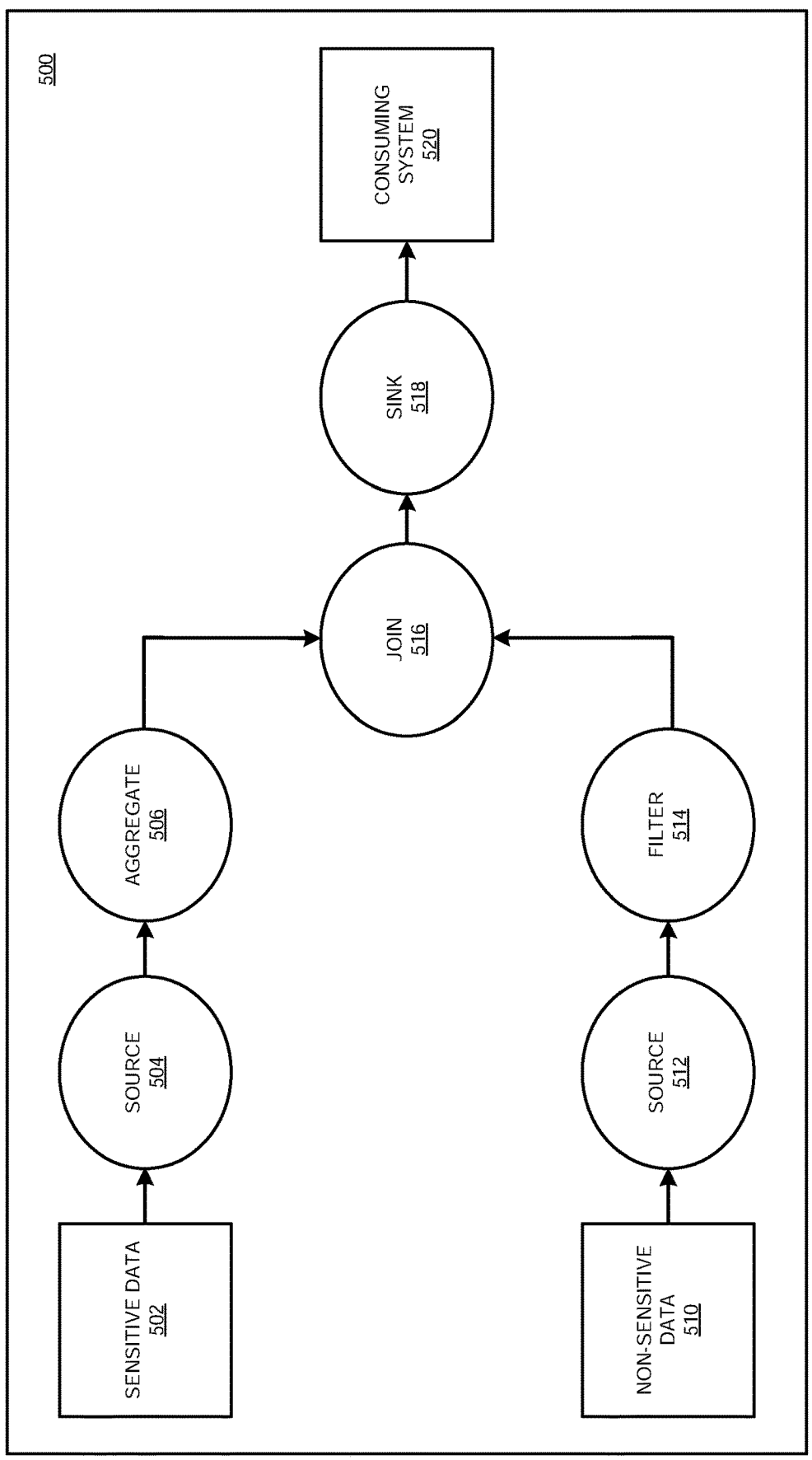
FIG. 5 depicts a block diagram of an exemplary streaming application in accordance with an illustrative embodiment.

With reference to FIG. 5, this figure depicts a block diagram of a simplified example streaming application 500 in accordance with an illustrative embodiment. The streaming application 500 is shown for clarity purposes as a non-limiting example of a streaming application that can benefit from disclosed embodiments.

As illustrated, the application 500 comprises a total of six stream operators: source operators 504 and 512, an aggregate operator 506, a filter operator 514, a join operator 516, and a sink operator 518. In the illustrated example, source operators 504 and 512 indicate beginning points of the application 500 that read data from external systems and produce respective streams as output. Source operators 504 and 512 operate to provide an ingest stage for the application 500, where the sources 504 and 512 consume continuous live data from disparate data sources, for example machine sensors, live feeds from social media sites, databases, or file systems, where the data can include structured data such as XML or JSON and unstructured data such as unstructured text, voice, or video. The aggregate operator 506 computes user-specified aggregations over tuples that are gathered in a window. The filter operator 514 removes tuples from a stream by passing along only those tuples that satisfy a user-specified condition. The join operator 516 correlates tuples from the two input streams based on user-specified match predicates and window configurations. For example, in some embodiments, when a join operator receives a tuple, the join operator compares it to all other tuples presently stored in the join operator "window" of memory, and if the join operator finds a matching tuple, then the join operator produces an output tuple for the match. The sink operator 518 writes data to external systems, for example a database, a file system, an alert system, or any other data consuming system, so the sink operator 518 is the end of the stream.

In the example shown in FIG. 5, the source operators 504 and 512 receives data from various data sources, but at the moment captured in FIG. 5, the source operator 504 is receiving sensitive data from a data source 502 and the source operator 512 is receiving non-sensitive data from a data source 510. In this embodiment, the streams application detects that the data received by source 504 is flagged as sensitive data, but the data received by source 512 is not flagged as sensitive data. Since the data received by source 512 is not sensitive data, the source 512 passes the received data along without adding any encryption. Since the data received by source 504 is sensitive data, it needs to be transmitted securely. However, it is possible that the data is already encrypted, and encrypting it again would impose an unnecessary delay and reduction in performance in terms of time taken to transfer the data to the consuming system 520. Therefore, the source 504 communicates with an encryption manager, for example as shown in FIG. 4, to determine if the data is already encrypted. If so, the data is passed along as-is to the consuming system 520; otherwise, the data is encrypted and then sent to the consuming system 520. In some embodiments, the data is encrypted using symmetric or asymmetric encryption, or the channel is encrypted, for example using secure socket layer (SSL)/transport layer security (TLS) protocol.

Figure 6:
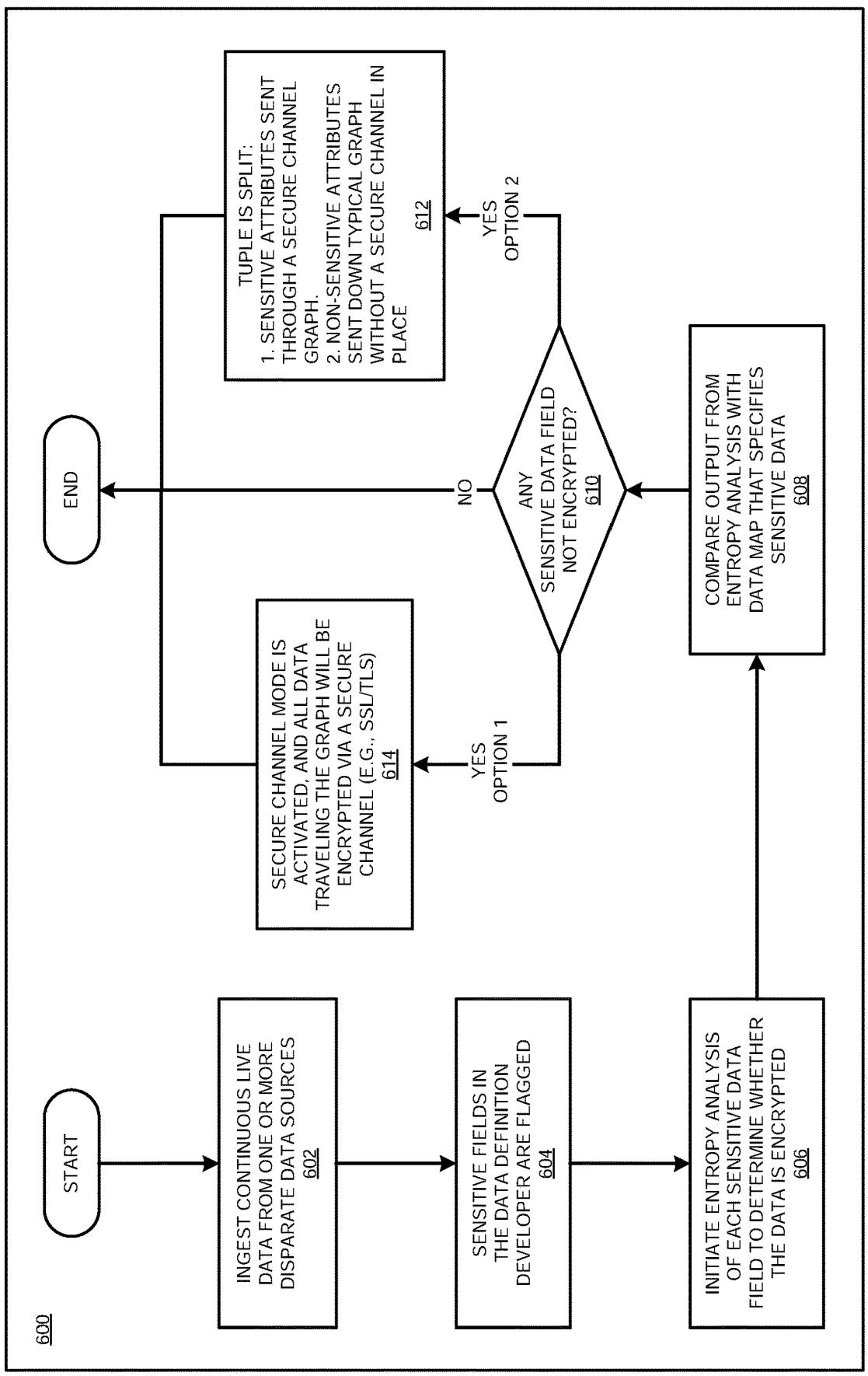
FIG. 6 depicts a flowchart of an example encryption management process in accordance with an illustrative embodiment.

With reference to FIG. 6, this figure depicts a flowchart of an example encryption management process 600 in accordance with an illustrative embodiment. In a particular embodiment, the management system 305 or stream manager 334 or encryption manager 336 in FIG. 3 carries out the process 600.

In an embodiment, at block 602, one or more source operators ingest continuous live data from one or more disparate data sources. In some embodiments, the source makes the data available to a management system, such as the management system. There, at block 604, the management system checks the data for flagged data indicating that the data is sensitive. Next, at block 606, the management system initiates entropy analysis of each sensitive data field that was flagged to be sensitive data only; the remaining data can be sent on the stream without encryption. The purpose of the entropy analysis is to determine whether the data is already encrypted. In an embodiment, at block 608, the process compare output from entropy analysis with a data map that specifies entropy threshold values for concluding that the data is sensitive but not animated. In an embodiment, at block 610, the process determines whether any sensitive data field is not encrypted. If so, the process continues to block 612 in some embodiments and continues to block 614 in other embodiments. In some embodiments, at block 612, the tuple is split such that sensitive attributes are sent through a secure channel graph; and non-sensitive attributes are sent down a typical graph without a secure channel in place. In other embodiments, at block 614 a secure channel mode is activated, and all data traveling the graph will be encrypted via a secure channel (e.g., SSL/TLS).

Figure 7:
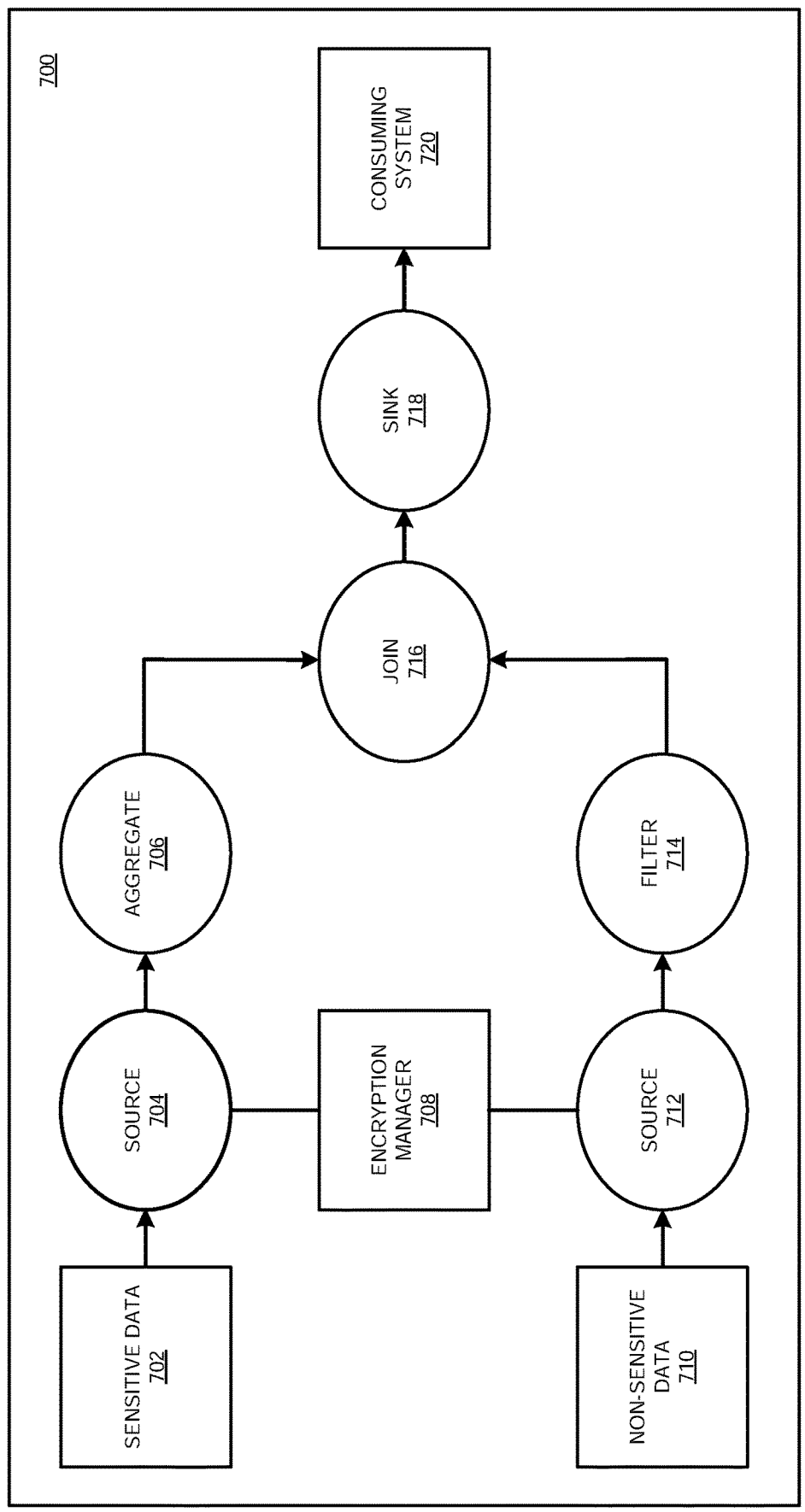
FIG. 7 depicts a block diagram of an exemplary streaming application in accordance with an illustrative embodiment.

With reference to FIG. 7, this figure depicts a block diagram of a simplified example streaming application 700 in accordance with an illustrative embodiment. The streaming application 700 is shown for clarity purposes as a non-limiting example of a streaming application that can benefit from disclosed embodiments.

As illustrated, the application 700 comprises source operators 704 and 712, an aggregate operator 706, a filter operator 714, a join operator 716, and a sink operator 718. As described in connection with FIG. 5, the source operators 704 and 712 read data from external systems and produce respective streams through aggregate operator 706 and filter operator 714, respectively, which are then joined by join operator 716 before reaching the end of the stream at the sink 718, which sends the results to the consuming system 720.

The application 700 further includes an encryption manager 708 in communication with the source operators 704 and 712. In some embodiments, the encryption manager 708 receives tuple data from the operators 704 and/or 712 as the tuple data is being streamed by the streams application and processed by the operators 704 and/or 712. The encryption manager 708 determines whether the tuple data includes sensitive data fields, and initiates encryption for any such sensitive data that are not already encrypted.

In some embodiments, the encryption manager 708 uses rule-based patterns and/or learned patterns to detect sensitive data fields. In some embodiments, the rule-based patterns are provided by a developer or system administrator. In some embodiments, the learned patterns are identified by (i.e., "learned by") the encryption manager 708. In some embodiments, the encryption manager 708 stores rules (e.g., provided by users) for identifying sensitive data and learns new rules based on what types of data are processed as sensitive data. For example, one rule for sensitive data may indicate that data in the form of "xxx-xx-xxxx" indicates a social security number.

In the example shown in FIG. 7, the source operators 704 and 712 receives data from various data sources, but at the moment captured in FIG. 7, the source operator 704 is receiving sensitive data from a data source 702 and the source operator 712 is receiving non-sensitive data from a data source 710. In this embodiment, the streams application uses the encryption manager 708 to detect that the data received by source 704 includes sensitive data, but the data received by source 712 does not include sensitive data. Since the data received by source 712 is not sensitive data, the source 712 passes the received data along without adding any encryption. Since the data received by source 704 is sensitive data, it needs to be transmitted securely. However, it is possible that the data is already encrypted, and encrypting it again would impose an unnecessary delay and reduction in performance in terms of time taken to transfer the data to the consuming system 720. Therefore, the encryption manager 708 also determines if any detected sensitive data is already encrypted. If so, the data is passed along as-is to the consuming system 720; otherwise, the data is encrypted and then sent to the consuming system 720. In some embodiments, the data is encrypted using symmetric or asymmetric encryption, or the channel is encrypted, for example using secure socket layer (SSL)/transport layer security (TLS) protocol.

Figure 8:
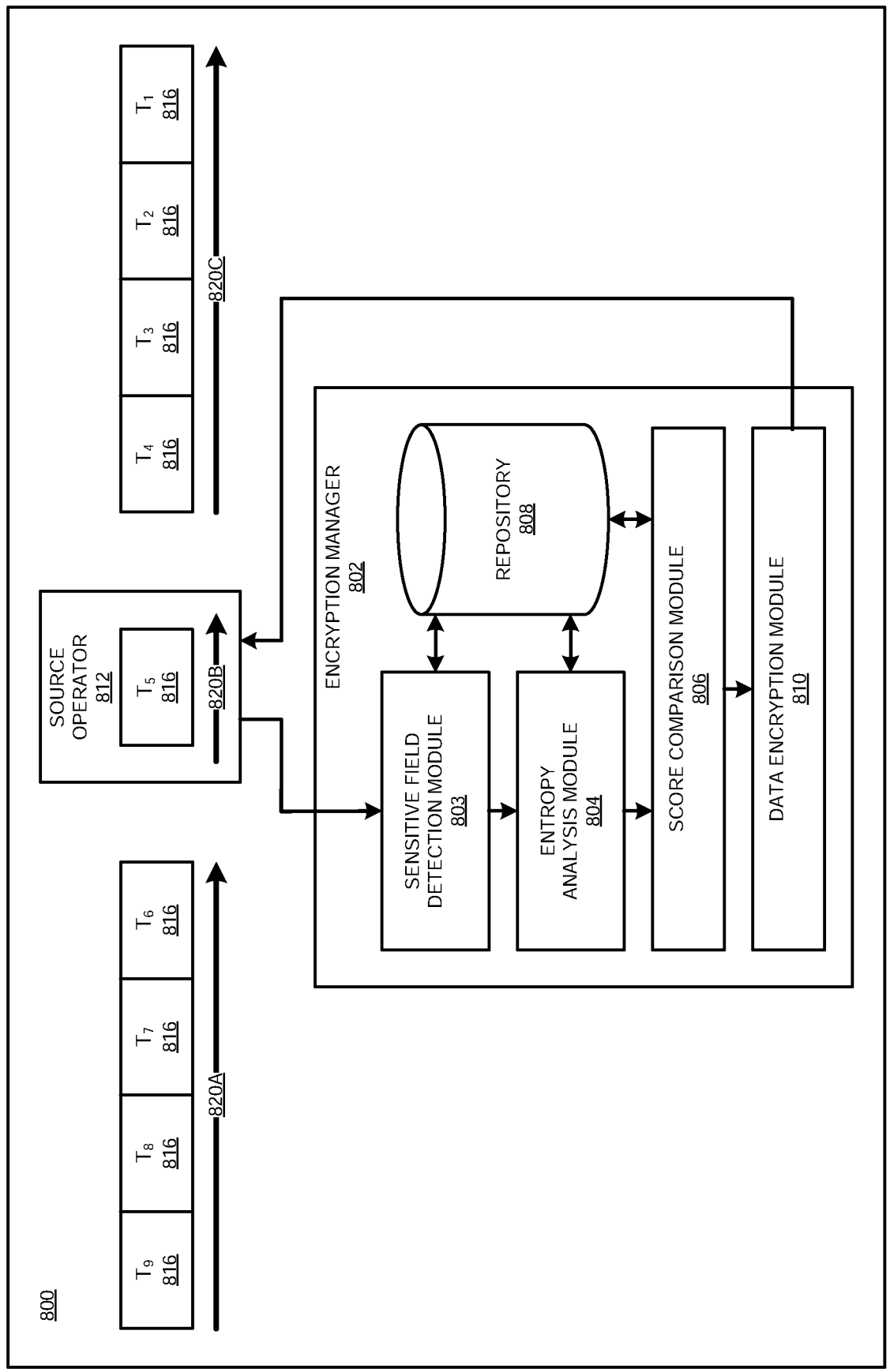
FIG. 8 depicts a block diagram of an example encryption manager in accordance with an illustrative embodiment.

With reference to FIG. 8, this figure depicts a block diagram of an example encryption management computing environment 800 in accordance with an illustrative embodiment. In an embodiment, the computing environment 800 includes an encryption manager 802 configured to selectively implement network security protocols on streaming data, which is an example of encryption manager 708 of FIG. 7.

In the illustrated embodiment, the encryption manager 802 includes a sensitive field detection module 803, an entropy analysis module 804, a score comparison module 806, a repository 808, and a data encryption module 810. The encryption manager 802 receives data being streamed by the streams application as the data is being processed by one or more operators 812 and outputs an indication as to whether any of the steaming data should be encrypted, transmitted on a secure channel, or transmitted without any additional security enhancement. For example, in some embodiments, the encryption manager 802 supports establishing connections that use either Secure Sockets Layer (SSL) or Transport Layer Security (TLS) cryptographic protocols. In some embodiments, the functionality described herein is distributed among a plurality of systems, which can include combinations of software and/or hardware based systems, for example Application-Specific Integrated Circuits (ASICs), computer programs, or smart phone applications.

As shown in FIG. 8, the operator 812 receives data tuples 816 on stream 820. For clarity purposes, the processed data includes tuples T1-T8 on stream portion 820C, the currently-processed tuple T5 on stream portion 820B, and the data streaming towards the as the operator 812 as tuples T6-T9 on stream portion 820A, although an actual implementation will have a stream of continuous data.

In some embodiments, the operator 812 is a source adapter (also referred to as a source operator or just a source) that is located at the beginning of the streams application. In some embodiments, the operator 812 processes data on a tuple-by-tuple basis as shown in FIG. 8. Alternatively, in some embodiments, the operator 812 operates on a window of data at a time. When processing is complete, the operator 812 submits the results as a new tuple to the next downstream operator unless the operator is a sink adapter, in which case the data stream ends.

In some embodiments, the repository 808 stores one or more rules for identifying sensitive data. In some embodiments, the repository 808 receives rules for identifying sensitive data from users. In some embodiments, sensitive field detection module 803 learns new rules via machine learning, for example from unsupervised training and/or from supervised training using historic training data.

In the illustrated embodiment, the encryption manager 802 includes a sensitive field detection module 803, an entropy analysis module 804, a score comparison module 806 as software, hardware or firmware components. In some embodiments, the sensitive field detection module 803 receives tuple data from the operator 812 as the tuple data is being streamed by the streams application and processed by the operator 812. In some embodiments, the sensitive field detection module 803 accesses one or more rules for identifying sensitive data from the repository 808 and uses the rules to detect sensitive data, for example using pattern-matching techniques. For example, one rule for sensitive data may indicate that data in the form of "xxx-xx-xxxx" indicates a social security number.

The entropy analysis module 804 receives data identified as sensitive data from the sensitive field detection module 803. The entropy analysis module 804 uses an entropy analysis of the tuple data to determine whether the data is encrypted. In some embodiments, the estimated measure of entropy is calculated as a measure of a degree of indeterminacy of information stored as data in the tuples, such as an estimated measure of Shannon entropy.

In some embodiments, the score comparison module 806 receives an estimated measure of entropy from the entropy analysis module 804 for comparison with a reference measure of entropy in the repository 808. The repository 808 is any suitable data storage mechanism for the storage of reference measures of entropy, such as a data structure, memory area, file, database or the like. While the repository 808 is illustrated as being internal to the encryption manager 802, the repository 808 can alternatively be located elsewhere. In some embodiments, the reference measure of entropy is a measure of entropy for an encrypted sample of data. The reference measure of entropy is predetermined by a suitable mechanism such as through observation of encrypted data.

Accordingly, in use, the score comparison module 806 is operable to compare an estimated measure of entropy from the entropy analysis module 804 with the reference measure of entropy for encrypted data. In response to a determination, by the score comparison module 806, that the estimated measure of entropy for tuple data from the operator 812 is sufficiently similar to the reference measure of entropy, the score comparison module 806 outputs a positive identification of encrypted data. The sufficiency of the similarity in the entropy measures can be achieved on the basis of a comparison algorithm including a comparison allowing for a degree of deviation based on a predetermined level of acceptable deviation. For example, in some embodiments, the reference measure of entropy is defined as a midpoint in a linear range of entropy measures deviating by a predetermined extent above and below the midpoint. Alternatively, in some embodiments, the reference measure of entropy is a range of reference entropy measures.

Figure 9:
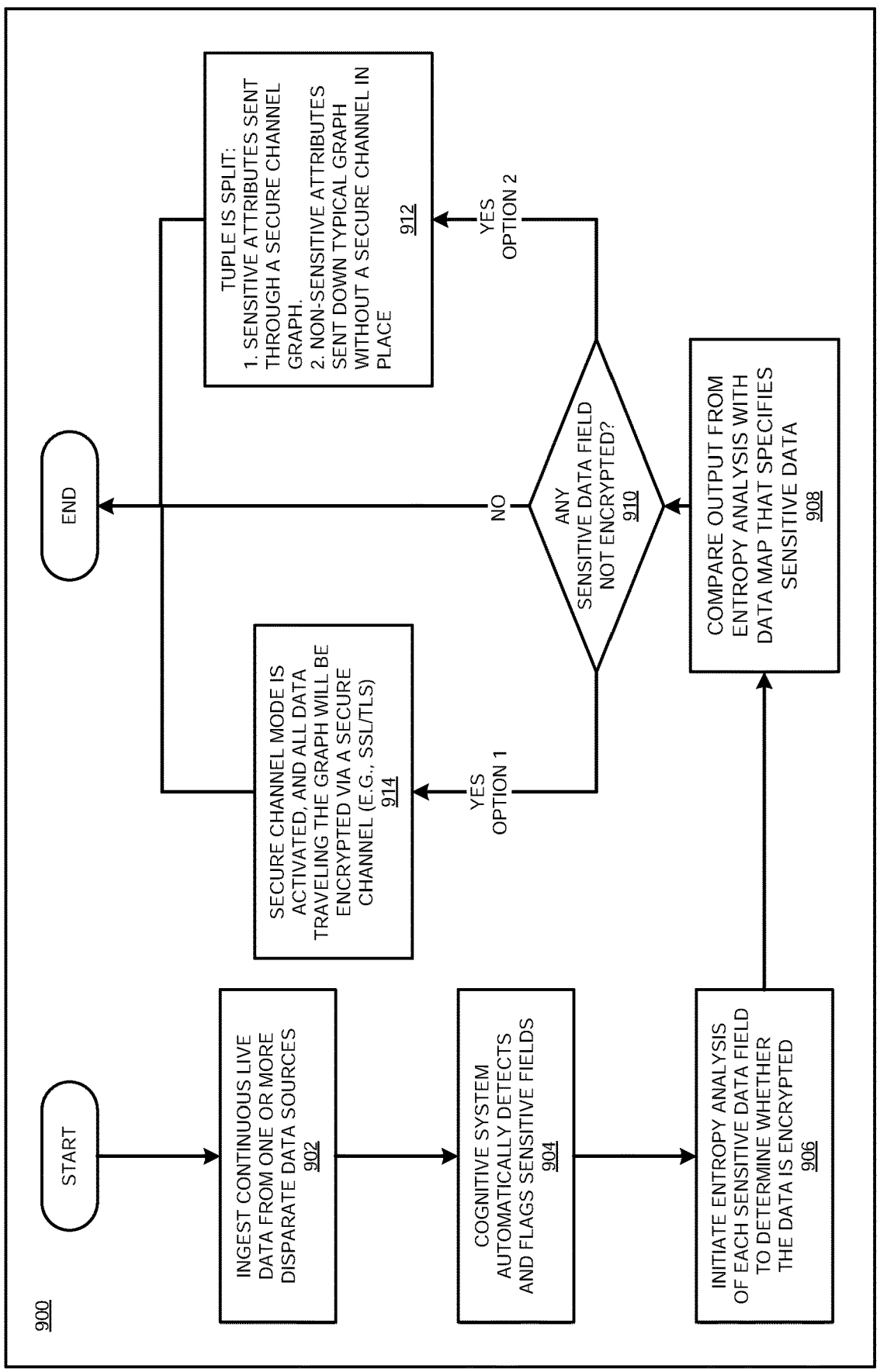
FIG. 9 depicts a flowchart of an example encryption management process in accordance with an illustrative embodiment.

With reference to FIG. 9, this figure depicts a flowchart of an example encryption management process 900 in accordance with an illustrative embodiment. In a particular embodiment, the management system 305 or stream manager 334 in FIG. 3 carries out the process 900 using the encryption manager 802 shown in FIG. 8.

In an embodiment, at block 902, one or more source operators ingest continuous live data from one or more disparate data sources. In some embodiments, the source makes the data available to a management system, such as the management system. There, at block 904, a cognitive system automatically detects and flags sensitive fields, for example using rule-based patterns and/or learned patterns to detect sensitive data fields. Next, at block 906, the management system initiates entropy analysis of each sensitive data field that was flagged to be sensitive data only; the remaining data can be sent on the stream without encryption. The purpose of the entropy analysis is to determine whether the data is already encrypted. In an embodiment, at block 908, the process compare output from entropy analysis with a data map that specifies entropy threshold values for concluding that the data is sensitive but not animated. In an embodiment, at block 910, the process determines whether any sensitive data field is not encrypted. If so, the process continues to block 612 in some embodiments and continues to block 614 in other embodiments. In some embodiments, at block 612, the tuple is split such that sensitive attributes are sent through a secure channel graph; and non-sensitive attributes are sent down a typical graph without a secure channel in place. In other embodiments, at block 614 a secure channel mode is activated, and all data traveling the graph will be encrypted via a secure channel (e.g., SSL/TLS).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method performed by a processor according to program instructions, the method comprising:
    determining, in response to receiving data as a tuple in a stream of tuples by a stream operator of a processing element, whether a characteristic of the data indicates that an attribute of the data includes sensitive information, the determining comprising:
        generating a data pattern corresponding to the characteristic of the data; and
        detecting a match between the generated data pattern and a pattern from a pattern collection,
    wherein the processing element is one of a plurality of processing elements forming an operator graph that defines an execution path for processing and routing of the stream of tuples;
    calculating, responsive to determining that the attribute includes sensitive information, an entropy value for the attribute;
    determining, responsive to the calculating of the entropy value, a likelihood that the attribute is encrypted by comparing the entropy value to a threshold value; and
    generating a parameter value for a cryptographic parameter for the attribute,
    wherein the program instructions are stored in a computer readable storage medium in a data processing system, and wherein the stored program instructions are transferred over a network from a remote data processing system.

2. The computer implemented method of claim 1, wherein the characteristic of the data comprises a flag indicative of whether the data includes sensitive information.

3. The computer implemented method of claim 1, wherein the stream operator is at a source node, and wherein the method further comprises:
    accessing the characteristic of the data while the data is at the source node; and
    transmitting the parameter value to the source node while the data is at the source node.

4. The computer implemented method of claim 1, wherein the determining of whether the characteristic of the data indicates that the attribute of the data includes sensitive information further comprises:
    associating, responsive to detecting the match, the attribute with a type of sensitive data that is associated with the pattern from the pattern collection.

5. The computer implemented method of claim 1, further comprising:
    determining that a characteristic of the data indicates that a second attribute of the data is free of sensitive information; and
    speeding up encryption processing, responsive to determining that the characteristic of the data indicates that the second attribute of the data is free of sensitive information, by omitting calculating a second entropy value for the second attribute.

6. The computer implemented method of claim 5, further comprising transmitting the attribute and the second attribute are transmitted from a source to a sink node along respective network paths.

7. A computer usable program product for selective encryption of streaming data, the computer program product comprising one or more computer readable storage media, and program instructions collectively stored on the one or more computer readable storage media, the program instructions executable by a processor to cause the processor to perform operations comprising:
    determining, in response to receiving data as a tuple in a stream of tuples by a stream operator of a processing element, whether a characteristic of the data indicates that an attribute of the data includes sensitive information, the determining comprising:
        generating a data pattern corresponding to the characteristic of the data; and
        detecting a match between the generated data pattern and a pattern from a pattern collection,
    wherein the processing element is one of a plurality of processing elements forming an operator graph that defines an execution path for processing and routing of the stream of tuples;
    calculating, responsive to determining that the attribute includes sensitive information, an entropy value for the attribute;
    determining, responsive to the calculating of the entropy value, a likelihood that the attribute is encrypted by comparing the entropy value to a threshold value; and generating a parameter value for a cryptographic parameter for the attribute, wherein the stored program instructions are stored in a computer readable storage medium in a data processing system, and wherein the stored program instructions are transferred over a network from a remote data processing system.

8. The computer usable program product of claim 7, wherein the characteristic of the data comprises a flag indicative of whether the data includes sensitive information.

9. The computer usable program product of claim 7, wherein the stream operator is at a source node, and wherein the operations further comprise:
   accessing the characteristic of the data while the data is at the source node; and
   transmitting the parameter value to the source node while the data is at the source node.

10. The computer usable program product of claim 7, wherein the determining of whether the characteristic of the data indicates that the attribute of the data includes sensitive information further comprises:
   associating, responsive to detecting the match, the attribute with a type of sensitive data that is associated with the pattern from the pattern collection.

11. The computer usable program product of claim 10, further comprising:
   determining that a characteristic of the data indicates that a second attribute of the data is free of sensitive information; and
   speeding up encryption processing, responsive to determining that the characteristic of the data indicates that the second attribute of the data is free of sensitive information, by omitting calculating a second entropy value for the second attribute.

12. The computer usable program product of claim 11, further comprising transmitting the attribute and the second attribute are transmitted from a source to a sink node along respective network paths.

13. The computer usable program product of claim 7, wherein the stored program instructions are stored in a computer readable storage device in a server data processing system, and wherein the stored program instructions are downloaded over a network to a remote data processing system for use in a computer readable storage device associated with the remote data processing system, further comprising:

program instructions to meter use of the computer usable code associated with the request; and
program instructions to generate an invoice based on the metered use.

14. A computer system comprising a processor and one or more computer readable storage media, and program instructions collectively stored on the one or more computer readable storage media, the program instructions executable by the processor to cause the processor to perform operations comprising:
   determining, in response to receiving data as a tuple in a stream of tuples by a stream operator of a processing element, whether a characteristic of the data indicates that an attribute of the data includes sensitive information, the determining comprising:
      generating a data pattern corresponding to the characteristic of the data; and
      detecting a match between the generated data pattern and a pattern from a pattern collection,
   wherein the processing element is one of a plurality of processing elements forming an operator graph that defines an execution path for processing and routing of the stream of tuples;
   calculating, responsive to determining that the attribute includes sensitive information, an entropy value for the attribute;
   determining, responsive to the calculating of the entropy value, a likelihood that the attribute is encrypted by comparing the entropy value to a threshold value; and
   generating a parameter value for a cryptographic parameter for the attribute,
   wherein the stored program instructions are stored in a computer readable storage medium in a data processing system, and wherein the stored program instructions are transferred over a network from a remote data processing system.

15. The computer system of claim 14, wherein the characteristic of the data comprises a flag indicative of whether the data includes sensitive information.

16. The computer system of claim 14, wherein the stream operator is at a source node, and wherein the operations further comprise:
   accessing the characteristic of the data while the data is at the source node; and
   transmitting the parameter value to the source node while the data is at the source node.

* * * * *